United States Patent
Van Evans et al.

[11] Patent Number: 6,120,848
[45] Date of Patent: Sep. 19, 2000

[54] METHOD OF MAKING A BRAZE SHEET

[75] Inventors: Timothy Van Evans, Ann Arbor; Matthew J. Zaluzec, Canton; Gerry A. Grab, Trenton; Henry Mehraban, Northville, all of Mich.; Ronald P. Burt, Broomfield; Stacy Y. Uyeda, Littleton, both of Colo.; John B. Eye, Denver, Pa.

[73] Assignees: Ford Motor Company, Dearborn, Mich.; Alcoa Inc., Pittsburgh, Pa.

[21] Appl. No.: 09/193,364

[22] Filed: Nov. 17, 1998

[51] Int. Cl.$^7$ .............................. B05D 3/12; B05D 1/06; B05D 1/28
[52] U.S. Cl. .................... 427/359; 427/475; 427/310; 427/376.1; 427/419.1; 427/428; 148/23; 148/26; 228/223; 228/224
[58] Field of Search .................... 427/458, 359, 427/376.1, 428, 419.1, 310, 475; 148/23, 26, 537, 645; 228/207, 223, 224, 33

[56] References Cited

U.S. PATENT DOCUMENTS

| | | |
|---|---|---|
| 4,177,303 | 12/1979 | Clipston et al. ............... 427/259 |
| 4,986,463 | 1/1991 | Zimmer . |
| 5,016,809 | 5/1991 | Winterbottom et al. . |
| 5,098,010 | 3/1992 | Carmichael et al. . |
| 5,398,865 | 3/1995 | Mittag . |
| 5,547,517 | 8/1996 | Iwai ............................ 148/24 |
| 5,549,239 | 8/1996 | Morley et al. ............... 228/207 |
| 5,677,268 | 10/1997 | Omosako et al. ........... 508/171 |
| 5,755,374 | 5/1998 | Prigmore . |
| 5,759,707 | 6/1998 | Belt et al. . |

FOREIGN PATENT DOCUMENTS

| | | |
|---|---|---|
| 0799667 | 10/1997 | European Pat. Off. . |
| 7-185884 | 7/1995 | Japan . |
| 7290281 | 7/1995 | Japan . |

*Primary Examiner*—Shrive Beck
*Assistant Examiner*—Michael Barr
*Attorney, Agent, or Firm*—Charles H. Ellerbrock; David W. Pearce-Smith

[57] ABSTRACT

A method is disclosed of making a braze sheet for a brazed assembly. The method includes the steps of providing a sheet of a core material and a composition cladding and mechanically embedding a flux into the sheet.

17 Claims, 1 Drawing Sheet

METHOD OF MAKING A BRAZE SHEET

BACKGROUND OF THE INVENTION

1. Field of the Invention

The present invention relates generally to brazed assemblies and, more specifically, to a method of making a braze sheet for a brazed assembly such as a heat exchanger.

2. Description of the Related Art

It is known to provide brazed assemblies such as heat exchangers. These heat exchangers may be condensers, evaporators, heater cores and coolers. Typically, the heat exchangers have alternating rows of tubes or plates with convoluted fins made of a metal material such as aluminum or an aluminum alloy. Many of these heat exchangers require external or internal brazing or a combination of both. Previously, the heat exchangers have been brazed in a vacuum furnace. Recently, a process known as "controlled atmosphere brazing" (CAB) has been used with non-corrosive fluxes. CAB brazing has been preferred over vacuum furnace brazing due to improved production yields, lower furnace maintenance requirements and greater braze process robustness.

It is also known that CAB brazing currently used to manufacture aluminum heat exchangers requires the use of fluxing agents being fluoride based in composition. The use of these fluxing agents with conventional aluminum heat exchangers promotes the dissociation and disruption of the native aluminum oxide ($Al_2O_3$) and suppresses the formation of magnesium oxide (MgO) on the surface of the aluminum heat exchanger to promote wetting of the molten clad layer between mating components. Flux application is accomplished by applying the flux to preassembled heat exchanger components by suspending the flux in a carrier, typically water or alcohol with or without a binder, applying the flux to the exterior of the heat exchanger and thoroughly drying the heat exchanger to remove excess carrier which would inhibit brazing.

Although CAB brazing has worked well, it suffers from the disadvantage that the components of the heat exchanger require individual fluxing before assembly and an overall fluxing of the completed assembly before brazing. Also, CAB brazing suffers from the disadvantage that the fluxing of the heat exchanger is costly, time consuming and requires considerable floor space and processing time.

SUMMARY OF THE INVENTION

Accordingly, the present invention is a method of making a braze sheet for a brazed assembly including the steps of providing a sheet comprising a core material and a composition cladding. The method includes the steps of mechanically embedding a flux into the sheet.

One advantage of the present invention is that a method of making a braze sheet for a brazed assembly is provided which eliminates the use of fluxing and offers manufacturing flexibility by allowing all aluminum brazed assemblies to be CAB brazed using a single process. Another advantage of the present invention is that the flux is mechanically embedded into a composition cladding that allows for flux brazing of the brazed assembly without the application of a fluxing agent prior to assembly to promote oxide layer breakdown. Yet another advantage of the present invention is that the mechanically embedded flux into the composition cladding of the brazed assembly eliminates the uses of fluxing in the manufacturing plant and is less expensive and less time consuming to manufacture. Still another advantage of the present invention is that the method allows flux to be applied during braze sheet fabrication, provides a more robust brazing process for internal braze joints and provides for green manufacturing by removing flux from the assembly plant for the brazed assembly. A further advantage of the present invention is that the method also allows for CAB brazing components such as evaporators and intercoolers which are typically vacuum brazed due to the difficulties associated with fluxing the internal surfaces of these components.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
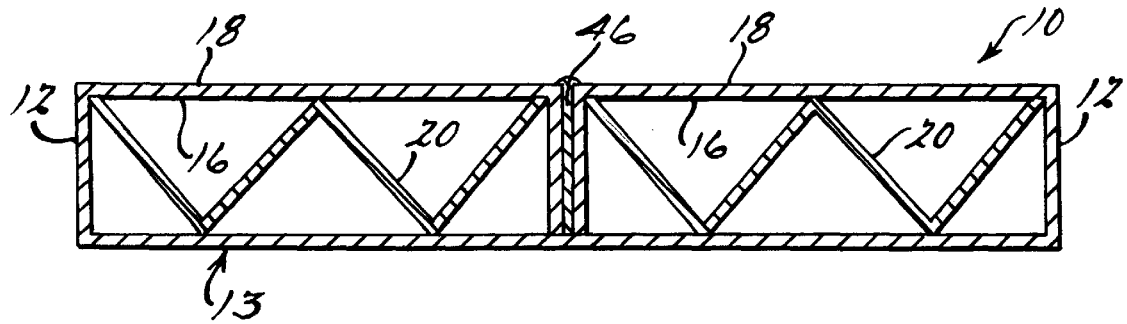
FIG. 1 is a cross-sectional view of a brazed assembly, according to the present invention.

Referring to FIG. 1, one embodiment of a brazed assembly, according to the present invention, is shown. At the outset, it will be apparent to those skilled in the art that the present invention, though disclosed in the embodiment of a heat exchanger assembly 10, may be used for other types of assemblies which require brazing. In this embodiment, the heat exchanger assembly 10 is a condenser for an air conditioning system (not shown) of a vehicle such as an automotive vehicle (not shown). It should be appreciated that the heat exchanger assembly 10 may be a parallel flow condenser, serpentine evaporator, heater core, or transmission oil cooler.

The heat exchanger assembly 10 includes at least one first component. The first component is at least one, preferably a plurality of tubes 12. Each tube 12 extends longitudinally and is generally rectangular in shape. In another embodiment, the first component may also be in the form of a plate, sheet or foil. In yet another embodiment, the first component may be an extrusion in the form of a tube, irregular shape, wire rod or bar.

Each tube 12 is made from a single sheet 13 of a core material 14 and a composition cladding 15 (FIG. 2) thereon. The core material 14 is made of an aluminum based material selected from the Aluminum Association 1XXX through 8XXX series aluminum alloys and preferably 3XXX, 5XXX and 6XXX series aluminum alloys. In another embodiment, the core material 14 is made of a copper based material. In yet another embodiment, the core material 14 is made of a nickel based material. In still another embodiment, the core material 14 is made of an iron based material.

The composition cladding 15 is a metal having a melting temperature less than a melting temperature of the core material 14. The composition cladding 15 includes an Aluminum Association 4XXX series aluminum and may contain lithium, magnesium or the like as alloying elements to provide clad flow and wettability as is known in the art. The composition cladding 15 is disposed on at least one side, preferably both sides of the core material 14 to form an internal surface 16 and an external surface 18. It should be appreciated that the exact alloys are not critical to practicing the invention.

The sheet 13 also has a flux 19 mechanically embedded into at least one, preferably both the internal surface 16 and external surface 18. The flux 19 is a material, preferably a fluoride (F) based material, having a melting temperature at or less than a melting temperature of the composition cladding 15. Alternatively, the flux 19 may be a chloride or other halogen containing material. Preferably, the flux 19 comprises fluoride (F) in combination with at least one of potassium (K), aluminum (Al), cesium (Cs), sodium (Na) and lithium (Li). Preferably, the flux 19 is of a potassium aluminum fluoride type known as "Nocolok" flux, a 50/50 mixture of $KAlF_4$ and $K_3AlF_6$. Other fluxes such as LiF and/or CsF and combinations of these fluxes mixed with $KAlF_4$ and $K_3AlF_6$ flux compounds may also be used. It should be appreciated that LiF and CsF fluxes allow use of high magnesium core materials. It should also be appreciated that the sheet 13 is made by cold rolling the flux 19 to mechanically embed the flux 19 into either one, or both, the surfaces 16 and 18 of the sheet 13 by a method to be described.

The heat exchanger assembly 10 includes at least one second component disposed adjacent the first component. In this embodiment, the heat exchanger assembly 10 includes the second component as a turbulator 20 disposed within each tube 12 adjacent the internal surface 16. The turbulator 20 extends longitudinally and laterally in a series of undulations. The turbulator 20 breaks up the flow through the tube 12 to effect heat transfer. In another embodiment, the heat exchanger assembly 10 may include the second component as a fin (not shown) disposed adjacent the external surface 18. The fin extends longitudinally and laterally in a series of undulations. In yet another embodiment, the second component may be an extrusion in the form of a tube irregular shape, wire rod or bar.

The second component is made of an aluminum based material selected from the Aluminum Association 1XXX through 8XXX series aluminum alloys and preferably 3XXX, 4XXX, 5XXX and/or 6XXX series aluminum alloys. In another embodiment, the second component is made of a copper based material. In yet another embodiment, the second component is made of a nickel based material. In still another embodiment, the second component is made of an iron based material.

Figure 2:
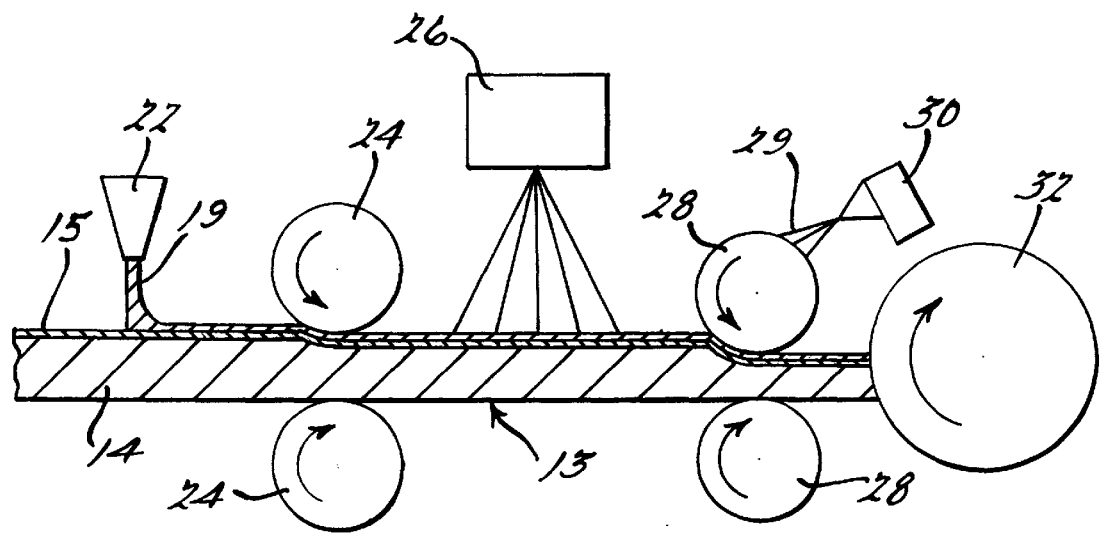
FIG. 2 is a fragmentary elevational view of a method, according to the present invention, of making a braze sheet for the brazed assembly.

A method, according to the present invention, for making a braze sheet is illustrated in FIG. 2. The method includes the steps of applying the flux 19 to the sheet 13. The flux 19 can be supplied into a flux hopper 22 and applied dry by conventional electrostatic apparatus or wet using a carrier. After the flux 19 is applied to the sheet 13, the method includes the step of coating the sheet 13 with the flux 19. The step of coating is accomplished by roll coating the sheet 13 with the flux 19 between a pair of rollers 24. The method includes the step of drying off the carrier of the flux 19 using heat. The step of drying is accomplished by drying the sheet 13 in a dry off station using heat from a heat source 26 wherein the carrier of the flux 19 is evaporated, leaving only flux 19 on the surface of the sheet 13. It should be appreciated that the steps of roll coating and drying are eliminated if electrostatic spraying is used.

The method includes the steps of reducing the thickness of the sheet 13 and mechanically embedding or impregnating the flux 19 into the composition cladding 15 of the sheet 13. In another embodiment, the flux 19 may be mechanically embedded into the core material 14 for a sheet 13 which lacks a composition cladding 15. The step of reducing is accomplished by reducing a thickness of the sheet 13 between one percent (1%) to thirty percent (30%) of its thickness, prior to the addition of the flux 19, between rollers 28 in a cold rolling mill, thereby allowing the harder flux 19, to become mechanically embedded into the surface 16, 18 of the sheet 13. The step of reducing is accomplished during one or more reductions.

The method also includes the step of coating the rollers 28 to resist or prevent the flux 19 from adhering to the rollers 28. The step of coating is accomplished by spraying a lubricant 29 such as a silicone mold release type or a vegetable oil type onto the rollers 28 with a sprayer 30 to keep the flux 19 from adhering to a surface of the rollers 28. The method includes the step of winding or coiling the braze sheet in a coil on a take up wheel 32. It should be appreciated that electrostatic fluxing would eliminate the need for a roll coater 24 and heat source 26.

Alternatively, the step of reducing may be accomplished through hot rolling. If hot rolling is chosen, the amount of reduction will exceed one percent (1%) to thirty percent (30%).

The mechanically embedded flux braze sheet provides flux 19 on either one, or both, of the internal and external surfaces 16 and 18 of the sheet 13 used in manufacturing the heat exchanger assembly 10. As a result, components such as evaporator plates, intercooler tubes, and other closed space aluminum heat exchanger components will have flux present on the internal surfaces prior to fabrication and assembly, eliminating the fluxing operations from the manufacturing plant. It should be appreciated that the rolling mill process is conventional and known in the art. It should also be appreciated that the method for mechanically embedding flux 19 into the composition cladding 15 of the core material 14 produces a prefluxed braze sheet which can be mechanically deformed.

Figure 3:
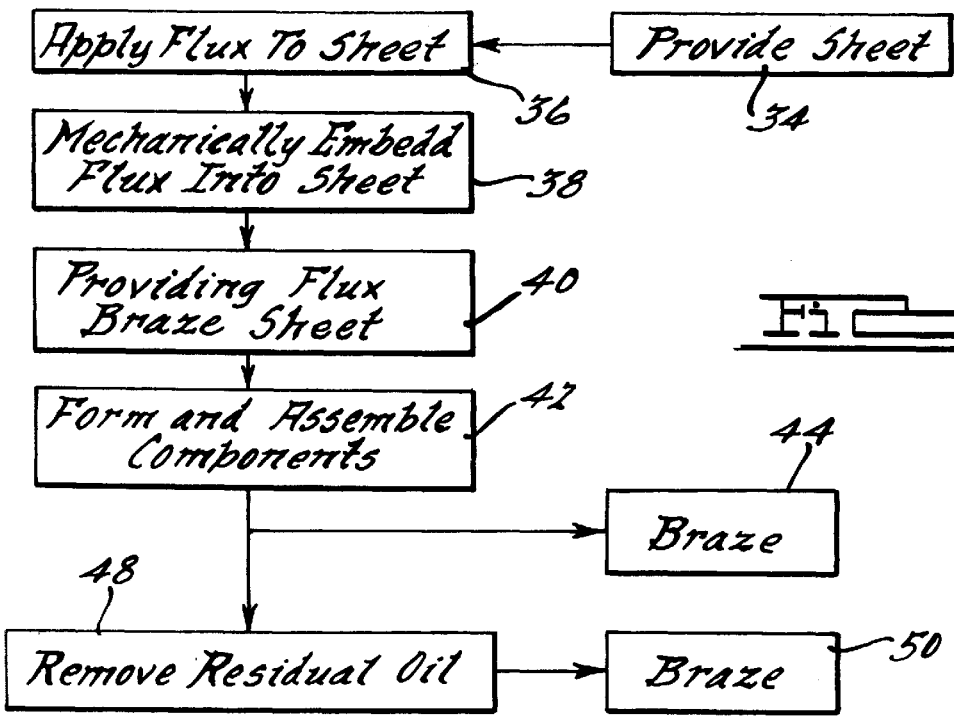
FIG. 3 is a flowchart of steps of a method, according to the present invention, of making the brazed assembly of FIG. 1.

Referring to FIG. 3, a method, according to the present invention, is provided for making a brazed assembly. In this embodiment, the heat exchanger assembly 10 is made using the mechanically embedded flux braze sheet. The method begins by providing the sheet 13 in block 34 and applying the flux 19 to the sheet 13 in block 36. The method includes mechanically embedding the flux 19 into the sheet 13 in block 38. The method includes the step of providing the mechanically embedded flux braze sheet in block 40. Next, the method includes the step of forming and assembling components of the heat exchanger assembly 10 in block 42. The step of forming is accomplished by stamping and rolling components of the heat exchanger assembly 10 by conventional and known methods and apparatuses. The braze sheet is stamped, rolled, and cut into various shapes, such as tubes, headers, side supports and fins. Evaporative oils in the form of forming lubricants which may be used in this step include both heavy and light weight lubricants and leave a residual surface film on the sheet. The step of assembling is accomplished by assembling components of the heat exchanger assembly 10 by conventional and known methods and apparatuses. It should be appreciated that the evaporative oils are conventional and known in the art.

The method includes the step of joining the components together of the heat exchanger assembly 10 using a brazing process in block 44. For joining of the heat exchanger assembly 10, the turbulator 20 is joined to the tube 12 using a CAB brazing process. During the CAB brazing process, the flux 19 in the composition cladding 15 liquefies at or about 550° C. and dissolves and chemically reduces the native aluminum oxide ($Al_2O_3$) layer on the internal surface 16 allowing the molten cladding layer to wet the internal surface 16. This wetting provides the medium to continue the dispersement of the oxide layer and allows the composition cladding 15 to flow into a joint therebetween and create a braze 46 (FIG. 1). It should be appreciated that the CAB brazing process is conventional and known in the art. It should also be appreciated that plates and manifolds (not shown) may have the flux 19 embedded into the composition cladding 15 to allow CAB brazing for evaporators and intercoolers.

Alternatively, the method may optimally include the step of removing residual oils from the heat exchanger assembly 10 in block 48. The step of removing is accomplished by spraying the heat exchanger assembly 10 with an aqueous solution such as an alkaline based solution for a specified time and concentration or dipping the heat exchanger assembly 10 into an alkaline based solution at a specified time, temperature and concentration. The heat exchanger assembly 10 is then thermally dried in an oven (not shown). Alternatively, the heat exchanger assembly 10 may be washed using a conventional aqueous cleaner. The method then includes the step of brazing the heat exchanger assembly 10 in block 50 which is similar to that of block 44 previously described.

Accordingly, the method delivers a finished product in a minimum of three steps by using a mechanically embedded pre-fluxed braze sheet in the assembly plant. The method eliminates the need for fluxing operations as well as aqueous cleaning at assembly plants and the possible detrimental effect of evaporative oils is eliminated. The mechanically embedded braze sheet provides for a more robust braze process by incorporating the flux 19 directly into the clad sheet 13, eliminating the need to apply flux to the pre-assembled aluminum brazed assembly.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of making a braze sheet for a brazed assembly, said method comprising the steps of:

provViding a sheet comprising a core material and a composition cladding;

coating a pair of rollers with a lubricant; and mechanically embedding a flux into the sheet by reducing a thickness of the sheet between the rollers in a rolling mill.

2. A method as set forth in claim 1 wherein said step of mechanically embedding comprises mechanically embedding the flux into the core material.

3. A method as set forth in claim 1 wherein said step of mechanically embedding comprises mechanically embedding the flux into the composition cladding.

4. A method as set forth in claim 1 including the step of coating the composition cladding with the flux.

5. A method as set forth in claim 4 wherein said step of coating comprises roll coating the sheet with the flux between another pair of rollers.

6. A method as set forth in claim 1 wherein the flux comprises fluoride (F) in combination with at least one from a group comprising potassium (K), aluminum (Al), cesium (Cs), sodium (Na) and lithium (Li).

7. A method as set forth in claim 1 including the step of applying the flux to the sheet with a carrier.

8. A method as set forth in claim 7 including the step of drying off the carrier.

9. A method for embedding flux into a surface of a sheet used to form a component of a brazed assembly, said method comprising the steps of:

providing a sheet;

applying a flux to the sheet;

coating a pair of rollers with a lubricant to resist the flux from adhering to the rollers; and reducing a thickness of the sheet between the pair of rollers to mechanically embed the flux into a surface of the sheet.

10. A method as set forth in claim 9 wherein said step of reducing comprises reducing the sheet between 1% to 30% of its thickness prior to said step of applying the flux.

11. A method as set forth in claim 9 wherein said step of applying comprises applying the flux dry using electrostatic spraying.

12. A method as set forth in claim 9 wherein said step of applying comprises applying the flux with a carrier.

13. A method as set forth in claim 9 wherein the flux is a fluoride based flux.

14. A method as set forth in claim 9 which said step of reducing comprises reducing the thickness of the sheet a plurality of reductions between the pair of rollers in a rolling unit.

15. A method as set forth in claim 9 wherein said step of applying comprises roll coating the sheet with the flux between another pair of rollers.

16. A method as set forth in claim 12 including the step of drying off a carrier of the flux.

17. A method as set forth in claim 9 wherein the lubricant is either one of a mold release or a vegetable oil.

\* \* \* \* \*